(12) United States Patent
Heemann et al.

(10) Patent No.: US 7,166,341 B2
(45) Date of Patent: Jan. 23, 2007

(54) HOT MELT ADHESIVES BASED ON GRAFT COPOLYMERS

(75) Inventors: Marcus Heemann, Neuss (DE); Thomas Moeller, Duesseldorf (DE); Ingo Gensch, Gangelt (DE); Wolfgang Klingberg, Korschenbroich (DE)

(73) Assignee: Henkel Kommanditgesellschaft auf Aktien (Henkel KGAA), Duesseldorf (DE)

( * ) Notice: Subject to any disclaimer, the term of this patent is extended or adjusted under 35 U.S.C. 154(b) by 186 days.

(21) Appl. No.: 10/762,175

(22) Filed: Jan. 21, 2004

(65) Prior Publication Data
US 2004/0159394 A1    Aug. 19, 2004

Related U.S. Application Data

(63) Continuation of application No. PCT/EP02/07880, filed on Jul. 16, 2002.

(30) Foreign Application Priority Data
Jul. 25, 2001    (DE)    ................. 101 36 212

(51) Int. Cl.
*C08L 51/08*    (2006.01)
*B32B 7/12*    (2006.01)

(52) U.S. Cl. .............. 428/34.1; 428/34.2; 428/35.7; 428/411.1; 428/500; 525/57; 525/63

(58) Field of Classification Search .......... 525/67, 525/57, 63; 428/34.1, 34.2, 35.7, 411.1, 428/500
See application file for complete search history.

(56) References Cited
U.S. PATENT DOCUMENTS 3,891,584 A    6/1975    Ray-Chaunduri et al.
5,217,798 A    6/1993    Brady et al.
5,321,105 A *  6/1994    Rekers et al. ............ 526/104
5,578,682 A * 11/1996    White ...................... 525/282
5,733,856 A *  3/1998    Gopalkrishnan et al. .. 510/360
5,985,074 A   11/1999    Heemann et al.
6,025,320 A *  2/2000    Appel et al. ............. 510/444
6,410,627 B1 * 6/2002    Paul et al. ................ 524/277
6,734,131 B1 * 5/2004    Shih et al. ................. 502/80

FOREIGN PATENT DOCUMENTS

| DE | 692 26 395 T2 | 4/1999 |
|----|---------------|--------|
| EP | 0 737 233 B1  | 2/1998 |
| EP | 0 512 250 B1  | 7/1998 |
| WO | WO 95/29952 A1 | 11/1995 |
| WO | WO 97/01483 A1 | 1/1997 |
| WO | WO 01/48045 A1 | 7/2001 |

OTHER PUBLICATIONS

Standard Test Method for Apparent Viscosity of Hot Melt Adhesives and Coating Materials, American Society for Testing and Materials, ASTM D 3236-88, pp. 1-8 (1999).

* cited by examiner

*Primary Examiner*—Jeffrey Mullis
(74) *Attorney, Agent, or Firm*—Woodcock Washburn LLP

(57) ABSTRACT

Water-soluble or water-dispersible hotmelt adhesives are prepared using graft copolymers produced by graft copolymerizing olefinically unsaturated monomers onto polyalkylene oxides. The adhesives additionally contain at least one resin which improves tackiness and the compatibility of the adhesive components. Other components such as polymers, plasticizers, and additives may also be present. The adhesives are especially suited for use in the labelling of recyclable or reuseable hollow containers. The adhesive may be completely separated from the hollow containers and dissolved in an alkaline washing liquor even at low temperatures.

15 Claims, No Drawings

HOT MELT ADHESIVES BASED ON GRAFT COPOLYMERS

This application is a continuation under 35 USC Sections 365(c) and 120 of International Application No. PCT/EP02/07880, filed 16 Jul. 2002 and published 6 Feb. 2003 as WO 03/010256, which claims priority from German Application No. 10136212.9, filed 25 Jul. 2001, each of which is incorporated herein by reference in its entirety.

FIELD OF THE INVENTION

This invention relates to a water-soluble or water-dispersible hotmelt adhesive based on graft copolymers, to its production and to its use for labelling recyclable or reusable hollow containers.

DISCUSSION OF THE RELATED ART

Hotmelt adhesives are adhesives which are applied as a melt to the substrates to be bonded and, after the substrates have been fitted together, set by solidifying on cooling.

Both pressure-sensitive adhesive systems and non-blocking granulatable adhesive systems are available are on the market.

Hotmelt adhesives based on graft copolymers are known. U.S. Pat. No. 3,891,584 describes a water-dispersible hotmelt adhesive containing 75 to 95 parts of a graft copolymer of about 40 to 80% vinyl monomer and about 20 to 60% by weight water-soluble polyalkylene oxide polymer and 5 to 25% by weight tackifying resin. The vinyl monomer is preferably vinyl acetate or low molecular weight alkyl-substituted acrylate. This hotmelt adhesive is used inter alia for labeling returnable bottles at high speeds. The labels can be removed by brief soaking in hot water.

DE 69226395 T2 describes a process for bonding nonwoven textile substrates to similar or different substrates which comprises applying a molten hotmelt adhesive composition containing
A. 50 to 100% by weight of a graft copolymer and
B. 0 to 50% by weight of a tackifying resin to at least one substrate. The graft copolymer comprises
   a) 40 to 85% by weight of at least one vinyl monomer,
   b) 15 to 60% by weight of at least one polyalkylene oxide polymer with a molecular weight of more than 3,000 and a content of at least 50% by weight polymerized ethylene oxide.

The adhesive has a $T_g$ of −40 to 40° C.

Hotmelt adhesives for labeling recyclable hollow containers are known. WO 97/01483 describes an adhesive system for bonding wrap-around labels which comprises a pickup adhesive and an overlap adhesive. If the pickup adhesive is to remain on the container and not on the label, it should preferably be alkali-soluble. An alkali-soluble pickup adhesive such as this contains
I. 20 to 58% by weight of at least one alkali-soluble polymer which serves as a backbone polymer,
II. 1 to 70% by weight of at least one resin based on functional hydrocarbon resins or optionally modified natural resins,
III. 0.5 to 30% by weight of at least one plasticizer and
IV. 0 to 3% by weight of at least one typical auxiliary and additive.

According to Example B), this adhesive dissolves completely in a 1% caustic soda solution in 2 to 10 minutes at 80° C. The advantage of this known adhesive is that the plastic containers or parts thereof are adhesive-free after the alkali wash and can be reused either directly or in the production of new containers.

However, the described systems have room for improvement. Where they are processed in high-performance labeling machines, but also when it comes to storage of labeled hollow containers which have been produced using the described adhesive systems, improvement, particularly in regard to cohesion, appears to be necessary.

Against the background of this prior art, the problem addressed by the present invention was to provide a water-soluble or water-dispersible hotmelt adhesive which would enable adhesive-containing products to be re-used in a simple, environmentally friendly and economic manner. The original positive application and performance properties of the hotmelt adhesive would, of course, remain unaffected.

Another problem addressed by the present invention was to provide a water-soluble or water-dispersible hotmelt adhesive which would have high inner strength (cohesion). This is necessary in order to guarantee smooth machine operation, particularly in the case of high-speed labeling machines, or prolonged storage of labeled hollow containers, more particularly hollow containers filled with liquids containing carbon dioxide.

Another problem addressed by the invention was to provide a water-soluble or water-dispersible hotmelt adhesive which could be applied at low temperatures.

Another problem addressed by the invention was to provide a water-soluble or water-dispersible hotmelt adhesive for hollow containers of recyclable material which would have high resistance to frozen water or condensation.

Another problem addressed by the invention was to provide a process for the production of a water-soluble or water-dispersible hotmelt adhesive having the properties mentioned above.

BRIEF SUMMARY OF THE INVENTION

The present invention provides a water-soluble or water-dispersible hotmelt adhesive based on at least one water-soluble, water-dispersible or alkali-soluble polymer prepared by graft copolymerization of olefinically unsaturated monomers onto polyalkylene oxides as component (A), characterized in that the hotmelt adhesive contains
A) 20 to 80% by weight of component (A),
B) 0 to 70% by weight of at least one polymer from the group of polyesters, polyurethanes, alkyl poly(meth)acrylates, acrylic acid homopolymers and/or copolymers and/or vinyl polymers,
C) 10 to 70% by weight of at least one resin,
D) 0 to 30% by weight of at least one plasticizer,
E) 0 to 3% by weight of at least one typical auxiliary and additive, the sum total of the components being 100% by weight.

DETAILED DESCRIPTION OF CERTAIN EMBODIMENTS OF THE INVENTION

The graft copolymers—component (A)—used in accordance with the invention are water-soluble, water-dispersible or alkali-soluble polymers which are prepared by graft copolymerization of olefinically unsaturated monomers onto polyalkylene oxides. Such graft copolymers are described, for example, in U.S. Pat. No. 3,891,584.

The polyalkylene oxides are preferably selected from the group of homopolymers of ethylene oxide, block copolymers of ethylene oxide (EO) and propylene oxide (PO), statistical copolymers of ethylene oxide (EO) and propylene oxide (PO) and are used individually or in the form of mixtures. The corresponding derivatives with esterified or etherified terminal groups are also suitable. Commercially available derivatives are, for example, polyglycols of the M and P41 (Clariant) series, such as triethylene glycol dimethylether, polyethylene glycol dimethylether, polyethylene glycol dibutylether, polyethylene glycol monoallylether, polyethylene glycol allylmethylether, polyethylene glycol diallylether and polyalkylene glycol monoallylether and polyalkylene glycol allylmethylether. Polyalkylene oxides mono- and di-esterified with fatty acids, more particularly esters based on caprylic acid, capric acid, lauric acid, myristic acid, palmitic acid, stearic acid, behenic acid, coconut fatty acid, palm kernel oil fatty acid or tallow fatty acid, as marketed for example by Cognis, are also used.

Commercially available EO/PO block copolymers are, for example, the copolymers sold under the PLURONIC trade name by BASF; commercially available statistical EO/PO copolymers are, for example, the copolymers sold under the trade name BREOX by International Speciality Chemicals. Statistical or block copolymers of ethylene oxide with other alkylene oxides, for example butylene oxide, are also suitable.

The polyalkylene oxides have a molecular weight of 400 to 50,000 g/mol, preferably in the range from 1,500 to 35,000 g/mol and more particularly in the range from 3,000 to 20,000 g/mol.

Combinations of high molecular weight polyalkylene oxides with low molecular weight polyalkylene oxides are particularly advantageous. Examples include mixtures of PEG 35000 with PEG 600, PEG 20000 with PEG 600 or PEG 12000 with PEG 600. Accordingly, even very high molecular weight polyalkylene oxides, which cannot be processed on their own because of their high melt viscosities, can be grafted by the processes described in the following.

Accordingly, only in such combinations is it also possible to use polyalkylene oxides with molecular weights above the 50,000 g/mol mentioned above. Corresponding polyalkylene oxide mixtures have Brookfield melt viscosities of 100 mPas to 80,000 mPas at 100° C., preferably in the range from 200 mPas to 40,000 mPas and more particularly in the range from 300 mPas to 10,000 mPas, as measured by ASTM D 3236-88.

With combinations such as these, the melt viscosities, crystallization behavior, cohesion and tackiness of the graft copolymers can be controlled as required.

The ethylene oxide content of the copolymers should be at least 50% by weight and is preferably at least 75% by weight.

The olefinically unsaturated monomers used for the purposes of the invention are used in quantities of 95 to 20% by weight, based on the total weight of the graft copolymer, preferably in quantities of 90 to 30% by weight and more particularly in quantities of 80 to 60% by weight.

In a particularly preferred embodiment, graft copolymer (A) is obtainable by reaction of a) 30 to 90% by weight of olefinically unsaturated monomer with b) 10 to 70% by weight polyalkylene oxide with a molecular weight of 400 to 50,000 g/mol, c) the ethylene oxide content of the polyalkylene oxide being at least 50% by weight.

The olefinically unsaturated monomers are selected from the group of i) vinyl esters of linear aliphatic carboxylic acids or branched aliphatic, araliphatic or cycloaliphatic carboxylic acids, ii) esters of acrylic acid and/or methacrylic acid with linear or branched aliphatic, araliphatic or cycloaliphatic alcohols, iii) mono- or diesters of unsaturated aliphatic dicarboxylic acids with linear or branched, aliphatic, araliphatic or cycloaliphatic alcohols.

Suitable olefinically unsaturated monomers are vinylesters of linear aliphatic carboxylic acids or branched aliphatic or cycloaliphatic carboxylic acids. Carboxylic acids containing 2 to 22 carbon atoms and more particularly 2 to 12 carbon atoms are preferred. Examples include vinyl acetate, vinyl propionate, vinyl laurate and/or vinyl versatate.

Other suitable olefinically unsaturated monomers are esters of acrylic acid with linear or branched aliphatic, araliphatic or cycloaliphatic alcohols. Preferred alcohols contain 1 to 22 carbon atoms, for example methyl acrylate, ethyl acrylate, butyl acrylate, hexyl acrylate, octyl acrylate, lauryl acrylate, stearyl acrylate, behenyl acrylate, tetrahydrofurfuryl acrylate, phenoxyethyl acrylate, dicyclopentadienyl acrylate. However, (meth)acrylamides are also suitable. Instead of the esters of acrylic acid, corresponding esters of other monocarboxylic acids, for example methacrylic acid, crotonic acid or cinnamic acid, may also be used.

Other monomers are derived from mono- or diesters of unsaturated aliphatic dicarboxylic acids with linear or branched aliphatic, araliphatic or cycloaliphatic alcohols. Alcohols with a C chain length of 1 to 22 carbon atoms are preferred. Examples of such dicarboxylic acids are fumaric acid, maleic acid, citraconic acid and itaconic acid. Examples of dicarboxylic acid monoesters are monomethyl fumarate, monobutyl fumarate, monomethyl maleate, monoethyl maleate, monobutyl maleate, monooctyl maleate, monolauryl maleate, monostearyl maleate. Examples of dicarboxylic acid diesters are dimethyl fumarate, dibutyl fumarate, dioctyl fumarate, dilauryl fumarate, dimethyl itaconate, diethyl itaconate, dibutyl itaconate, dimethyl maleate, diethyl maleate, dibutyl maleate, dioctyl maleate, dilauryl maleate, distearyl maleate, dimethyl citraconate, dibutyl citraconate, dioctyl citraconate.

Other monomers are acrylonitrile, styrene and α-methylstyrene. The preferred monomer is vinyl acetate. The above-mentioned monomers may be used individually or in the form of mixtures. In such cases, mixtures with vinyl acetate are preferred and the other monomers are typically used in quantities of at most up to 50% by weight, preferably up to 20% by weight, more preferably up to 10% by weight and most preferably up to 5% by weight, based on the graft copolymer. Mixtures of vinyl acetate with long-chain monomers are particularly suitable. The following binary combinations in particular are mentioned in this regard: vinyl acetate with vinyl laurate, vinyl acetate with vinyl versatate, vinyl acetate with lauryl acrylate, vinyl acetate with lauryl methacrylate, vinyl acetate with dibutyl maleate, vinyl acetate with dibutyl itaconate or vinyl acetate with dibutyl fumarate. These mixtures provide the graft copolymers with particular tackiness. Accordingly, preferred olefinically unsaturated monomers are mixtures of vinyl acetate with vinyl laurate, vinyl versatate, lauryl acrylate, lauryl methacrylate, dibutyl maleate, dibutyl itaconate or dibutyl fumarate, the percentage content of vinyl acetate in the mixture being from 44% by weight to 98% by weight.

A particularly preferred embodiment is characterized by the use of mixtures of vinyl acetate with vinyl laurate in which the vinyl laurate is present in a quantity of at most up to 50% by weight, preferably up to 20% by weight, more preferably up to 10% by weight and most preferably up to 5% by weight, based on the graft copolymer.

Vinyl monomers containing polar groups are also suitable, including for example N-vinyl pyrrolidone, N-vinyl caprolactam, vinyl sulfonates (for example sodium vinyl sulfonate), vinyl phosphonates, N-vinyl formamides, N-vinyl acetamides, hydroxyethyl acrylate, hydroxypropyl acrylates, monoacrylates of polyalkylene glycols; acrylic acid esters or acrylic acid amides containing amine groups and the analogous methacrylic acid derivatives are also suitable.

Mixtures of these polar monomers with one another are also suitable. They are normally used in combination with the monomers mentioned above. These polar monomers are typically used in quantities of at most up to 50% by weight, preferably up to 20% by weight, more preferably up to 10% by weight and most preferably up to 5% by weight, based on the graft polymer.

Monomers containing acid groups may also be used in order to improve alkali solubility. They are normally used in combination with the monomers mentioned above. The monomers containing aid groups may be selected, for example, from acrylic acid, methacrylic acid, fumaric acid, maleic acid, crotonic acid, itaconic acid, citraconic acid or cinnamic acid. The anhydrides of the dicarboxylic acids mentioned above may also be used. These monomers are typically used in quantities of at most up to 50% by weight, preferably up to 20% by weight, more preferably up to 10% by weight and most preferably up to 5% by weight, based on the graft polymer.

One particular embodiment of the invention is a water-soluble or water-dispersible hotmelt adhesive based on at least one water-soluble, water-dispersible or alkali-soluble polymer prepared by graft copolymerization of olefinically unsaturated monomers onto polyalkylene oxides as component (A), at least one olefinically unsaturated monomer from the group of a) esters of crotonic acid, cinnamic acid, mono- or di-esters of fumaric acid, maleic acid, citraconic acid or itaconic acid or from the group of b) vinyl esters, acrylates or methacrylates corresponding to general formula (I) and/or (II):

$$CH_2=CH-O-C(O)-R_1 \text{ with } R_1=C_{11-21} \quad (I)$$

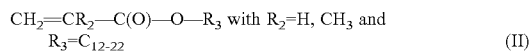

$$CH_2=CR_2-C(O)-O-R_3 \text{ with } R_2=H, CH_3 \text{ and } R_3=C_{12-22} \quad (II)$$

being used and being present in the graft copolymer in a quantity of 5 to 50% by weight.

Suitable polymerization initiators are, above all, organic peroxides, such as diacetyl peroxide, dibenzoyl peroxide, di-tert-butyl peroxide, tert-butyl peroxybenzoate, tert-butyl perpivalate, succinyl peroxide, tert.butyl permaleate, tert-butyl hydroperoxide, cumene hydroperoxide, di-tert-amyl peroxide, tert-butyl peracetate, tert-butyl perisobutyrate, dilauroyl peroxide, dioctanoyl peroxide, diisopropyl peroxydicarbamate, didecanoyl peroxide, bis-(o-tolyl)-peroxide. Mixtures of the initiators mentioned, redox initiators or azo initiators are also suitable.

The water-soluble or water-dispersible hotmelt adhesive according to the invention contains 0 to 70% by weight of at least one polymer from the group of polyesters, polyurethanes, alkyl polyacrylates or polymethacrylates, acrylic acid homopolymers and/or copolymers and/or vinyl polymers as component (B).

One particular embodiment of the invention is a water-soluble or water-dispersible hotmelt adhesive based on at least one water-soluble, water-dispersible or alkali-soluble polymer prepared by graft copolymerization of olefinically unsaturated monomers onto polyalkylene oxides as component (A), characterized in that the hotmelt adhesive contains:

A) 20 to 80% by weight of component (A),
B) 1 to 70% by weight of at least one polymer from the group of polyesters, polyurethanes, alkyl poly(meth)acrylates, acrylic acid homopolymers and/or copolymers and/or vinyl polymers,
C) 10 to 70% by weight of at least one resin,
D) 0 to 30% by weight of at least one plasticizer,
F) 0 to 3% by weight of at least one typical auxiliary and additive, the sum total of the components being 100% by weight.

In a preferred embodiment, the hotmelt adhesive according to the invention contains:

B1) as component (B1), 10 to 50% by weight of a (meth) acrylic acid homopolymer and/or copolymer and/or
B2) as component (B2), 5 to 30% by weight of a saturated and/or unsaturated polyester and/or
B3) at least one alkyl poly(meth)acrylate as component (B3), the alkyl group having a chain length of 1 to 18 carbon atoms, and/or
B4) as component (B4), a polyvinyl alcohol with a molecular weight above 1,000 g/mol and/or a polyvinyl alkylether containing 1 to 14 carbon atoms in the alkyl group and/or
B5) as component (B5), 5 to 30% by weight of a polyurethane.

Component (B) preferably contains at least one (meth) acrylic acid homopolymer and/or copolymer; styrene, methylstyrene and/or other alkylstyrenes and α-olefins may be used as comonomer. The at least one (meth)acrylic acid homopolymer and/or copolymer—component (B1)—may be present in the hotmelt adhesive according to the invention in a quantity of 10 to 50% by weight, preferably 5 to 35% by weight and more particularly 10 to 30% by weight.

In a preferred embodiment, at least one polyester is present in component (B) as component (B2). The polyester (B2) is preferably a saturated and/or unsaturated polyester. Preferred polyesters are based on aromatic dicarboxylic acids, such as phthalic acid or terephthalic acid, with at least one polyol from the group consisting of neopentyl glycol, glycerol or pentaerythritol. The esters based on aromatic dicarboxylic acids containing sulfo groups disclosed in EP 0737233 are particularly preferred.

Component (B2) is present in the hotmelt adhesive according to the invention in a quantity of 5 to 30% by weight and preferably in a quantity of 8 to 25% by weight.

In a preferred embodiment, component (B) contains at least one alkyl poly(meth)acrylate as component (B3). The alkyl group preferably has a chain length of 1 to 18 carbon atoms and, more particularly, 1 to 4 carbon atoms.

Component (B3) is present in the hotmelt adhesive according to the invention in a quantity of 5 to 40% by weight and preferably 8 to 20% by weight.

In a preferred embodiment, component (B) contains at least one vinyl polymer as component (B4). The preferred group of vinyl polymers includes, for example, polyvinyl alcohol with a molecular weight above 1,000 g/mol, polyvinyl pyrrolidone, vinyl pyrrolidone/vinyl acetate copolymers, polyvinyl ethers, more particularly polyvinyl alkylethers containing 1 to 4 carbon atoms in the alkyl group, for example polyvinyl methylether or polyvinyl ethylether.

Component (B4) is present in the hotmelt adhesive according to the invention in a quantity of 5 to 40% by weight and preferably in a quantity of 8 to 20% by weight.

In a preferred embodiment, component (B) contains at least one polyurethane as component (B5). The polyurethanes used contain at least one terminal OH group and have a molecular weight of 2,000 g/mol to 100,000 g/mol and preferably in the range from 10,000 g/mol to 70,000 g/mol. Component (B5) has a melt viscosity of up to 200,000 mPa·s at 190° C. and a softening range of 50 to 70° C.

The hotmelt adhesive according to the invention contains a resin as component (C). The resin provides for additional tackiness and improves the compatibility of the hotmelt adhesive components. It is used in a quantity of 10 to 70% by weight. The resin is selected from a) hydroabietyl alcohol and esters thereof, more especially esters with aromatic carboxylic acids, such as terephthalic acid and phthalic acid,
b) preferably modified natural resins, such as resinic acids of balsam resin, tallol resin or wood rosin, for example fully saponified balsam resin or alkyl esters of optionally partly hydrogenated rosin with low softening points, for example methyl, diethylene glycol, glycerol and pentaerythritol esters,
c) SMA resins (copolymers of styrene and maleic anhydride),
d) acrylic acid copolymers, preferably styrene/acrylic acid copolymers, and
e) resins based on functional hydrocarbon resins.

An alkyl ester of partly hydrogenated rosin—the alkyl group preferably containing 1 to 6 carbon atoms—may also be used as the tackifying resin.

Acrylic acid copolymers are preferably used.

The plasticizer, component (D), is preferably used to adjust viscosity and is generally present in the hotmelt adhesive according to the invention in a concentration of 0 to 30% by weight and preferably in a concentration of 5 to 30% by weight. Suitable plasticizers are monohydric or polyhydric alcohols, preferably glycol monophenyl ether, hexamethylene glycol, glycerol and, in particular, polyalkylene glycols with a molecular weight of 200 to 6,000. Polyethylene glycols with a molecular weight of up to about 1,000 and preferably up to about 600 and esterified or etherified derivatives thereof are preferred. Polypropylene glycol, polybutylene glycol and polymethylene glycol are also suitable. Esters, for example liquid polyesters and glycerol esters, such as glycerol diacetate and glycerol triacetate, and neopentyl glycol dibenzoate, glyceryl tribenzoate, pentaerythritol tetrabenzoate and 1,4-cyclohexane dimethanol dibenzoate, are preferably used as the plasticizers. Finally, alkyl monoamines and fatty acids preferably containing 8 to 36 carbon atoms may also be used.

Plasticizers based on aromatic dicarboxylic acid esters, i.e., the corresponding ester of phthalic acid, isophthalic acid or terephthalic acid, are preferably used. The alcohol component of these esters used as plasticizers normally contains 1 to 8 carbon atoms.

Other suitable plasticizers are alkyl monoamines and fatty acids; alkyl monoamines and fatty acids containing 8 to 36 carbon atoms are preferred.

Suitable plasticizers are, above all, medicinal white spirit and naphthenic mineral oils.

In a preferred embodiment, the hotmelt adhesive according to the invention contains A) 20 to 80% by weight of at least one graft copolymer,
B) 5 to 20% by weight of at least one saturated and/or unsaturated polyester as component (B2),
C) 10 to 70% by weight of at least one acrylic acid copolymer as component (C),
D) 5 to 25% by weight of at least one plasticizer based on polyalkylene glycol with a molecular weight of 200 to 6,000 g/mol as component (D), the sum total of the components being 100% by weight.

In addition, typical auxiliaries and additives—component (E)—may be incorporated in the hotmelt adhesive according to the invention. These include, above all, stabilizers. The function of stabilizers is to prevent the reactive monomers from entering into an unwanted or premature reaction and to protect the polymers against decomposition during processing. Such stabilizers are, in particular, antioxidants. They are added to the hotmelt adhesive in quantities of typically up to 3% by weight and preferably about 0.1 to 1.0% by weight. Other auxiliaries and additives are pigments, more particularly $TiO_2$.

The hotmelt adhesive according to the invention is used for bonding substrates by application in the form of a melt and by setting on cooling to room temperature (=hotmelt adhesive). The hotmelt adhesive according to the invention is generally solid at 20° C. and free from solvents which would be troublesome during application from the melt.

The hotmelt adhesive according to the invention is generally prepared by mixing the components. To this end, optionally a polymer from the group of polyesters, polyurethanes, alkyl poly(meth)acrylates, acrylic acid homo- and/or copolymers and/or vinyl polymers (component B), optionally a resin (component C), optionally plasticizers (component D) and optionally at least one of the usual auxiliaries and additives (component E) are mixed at 120 to 180° C. and more particularly at ca. 140° C. to form a homogeneous melt. The graft copolymer (component A) is then added, followed by stirring to homogeneity. After the completely homogenized composition has been packed in suitable containers, it is left to cool, solidifying in the process. It is now ready for use. The melt could of course also be directly applied to a substrate without cooling and thus directly used for bonding without a cooling phase.

However, like other commercially available hotmelt adhesives, the hotmelt adhesive according to the invention is melted before use and then applied to the substrate to be bonded.

The hotmelt adhesives according to the invention are used to bond substrates of which at least one is to be re-used. The substrates are such materials as glass, metal, lacquered or unlacquered paper or corresponding paperboards and, above all, plastics, for example PET, PEN, PP, PVC, PS and PE. Containers or films, for example, may be produced from such materials. In a particular embodiment of the invention, the substrates to be bonded are, on the one hand, containers and, on the other hand, labels.

Examples of containers include bottles, cans, drums, tubes or cartridges. They consist essentially of optionally plated or galvanized metal, for example tin plate or aluminum, glass or thermoplastics, such as polyethylene terephthalate, polycarbonate, polyethylene, polypropylene, polyvinyl chloride or polystyrene. A polar plastic, more particularly a polyester, is preferably used. Corresponding hollow containers are used in particular for mineral waters and refreshing drinks.

The labels consist on the one hand of thermoplastics, such as polyethylene, polypropylene, polystyrene, polyvinyl chloride or cellophane. It is preferred to use labels of a film based on nonpolar plastics, more particularly oriented polypropylene (OPP). However, the labels may also be based on paper, optionally in combination with a polymer. Depending on the material and the production process, the following labels, for example, may be used: simple labels of nonfinished paper, labels of surface-finished paper, high-gloss labels of cast-coated label papers, labels of papers coated with aluminum by vapor deposition and labels of aluminum-lined papers. The shape of the labels does not have to meet any particular requirements. Wrap-around labels and shield labels, for example, may be used.

A specific application of the hotmelt adhesive according to the invention is the labeling of re-usable materials, more particularly hollow containers of PET labeled with paper or plastic labels.

In the process of labeling with hotmelt adhesives, a pickup adhesive is normally applied to the label or to the hollow container. The label is fixed on the hollow container by the pickup adhesive and is normally in the form of a wrap-around label. An overlap adhesive is applied to the end of the label by rollers or comparable application systems. The hotmelt adhesive according to the invention may be used both as a pickup adhesive and as an overlap adhesive. This simplifies the labelling process. For example, there is no need for a second melting tank.

By virtue of the balanced ratio of cohesion to adhesion, the hotmelt adhesive according to the invention has very good pickup properties, particularly in high-performance labeling machines where up to 50,000 hollow containers per hour are labeled. In other words, both the pickup of the labels and their application to corresponding hollow containers take place smoothly. In addition, in high-performance labeling machines, the hotmelt adhesive according to the invention is distinguished by good machine running properties, i.e., it does not string and causes minimal, if any, soiling.

Where plastic labels in particular are used, low processing temperatures are necessary. The processing temperatures are in the range from 70° C. to 150° C. and preferably in the range from 90° C. to 140° C.

For problem-free processing, the adhesives used must have a suitably low viscosity. The hotmelt adhesives according to the invention have a Brookfield viscosity, as measured to ASTM D 3236-88, in the range from 200 mPas to 2,500 mPas, preferably in the range from 400 mPas to 1,500 mPas and more particularly in the range from 600 mPas to 1,000 mPas at 150° C. Their low viscosity enables the hotmelt adhesives according to the invention to be applied by roller application systems (for example Krones Canmatic), segment application systems (for example Kones Contiroll) or—given a suitable formulation—by commercially available nozzle systems (for example Nordson).

The water-soluble or water-dispersible hotmelt adhesives according to the invention are used quite generally for applications where bonded articles or bonds are disintegrated in water or aqueous media. Such applications include sanitary articles, for example diapers or lavatory paper, or articles used in packaging. In the packaging field, the invention may be used in particular in labeling, in the closure of boxes and in bookbinding.

Another specific application of the hotmelt adhesives according to the invention is the labeling of PET hollow containers which are to be re-used after use (re-usable systems) or recycled. The hotmelt adhesives according to the invention are suitable both for old recycling systems and for more recent systems (WO 95/29952 of United Resource Recovery Corporation).

In the recycling processes originally used, the hollow containers labeled with hotmelt adhesives are sorted according to type, size-reduced and then washed in an energy-intensive and laborious washing process in water and alkali baths. All soils (including adhesive) have to be removed as far as possible from the PET in order to guarantee high purity and hence re-usability for PET containers (possibly even for foods) with a high recycle content (up to 30%).

Washing alkali concentrations of 2% and temperatures of 90° C. are typical of the washing process. The residence time may be up to 20 minutes.

The hotmelt adhesives according to the invention are readily soluble both in cold water and in warm water. The residence time can thus be reduced to 10 minutes, the washing alkali concentration to 1% and the washing temperature to 40–50° C. At room temperature, the residence time in a 1% washing alkali is 10 to 15 minutes.

By using the hotmelt adhesives according to the invention, good separation from the useful materials is achieved in the alkaline medium (typically 0.5 to 2% NaOH solution) or in water. In addition, the adhesive is effectively prevented from re-accumulating in the form of so-called stickies on the useful material or in the recycling plants. Even if the hotmelt adhesive according to the invention is pressure-sensitive, it is "detackified" in the alkaline medium and does not re-accumulate on the useful material or in the recycling plants. In the particular case of bonds with hollow containers of recyclable material which are intended to have high resistance to frozen water or condensation, the necessary insolubility in water, but complete solubility or dispersion in the alkaline medium in alkalis can be achieved by suitable formulations.

However, all the hotmelt adhesives according to the invention can readily be removed in the described recycling process.

However, the process according to the invention involving the hotmelt adhesives according to the invention not only provides for relatively mild washing conditions, the recycled PCT is also of high quality and can be re-used in new bottles to a greater extent than otherwise usual (>50%).

In addition, the hotmelt adhesives according to the invention are also particularly suitable for more recent recycling systems as disclosed, for example, in WO 95/29952. In this way, 100% re-use of the container material can be guaranteed, even for food packs. The size-reduced polyester plastics, preferably PET, are first washed in alkali, after which the polyester plastic is converted into its salts in an alkaline atmosphere. By virtue of the water-soluble, water-dispersible or alkali-soluble properties of the hotmelt adhesives according to the invention, the adhesive is, ideally, not introduced at all into the second process step. Any minimal residues of the adhesive there still may be, however, are reacted to form volatile gases as described in WO 95/29952 and may then readily be removed.

The invention is illustrated by the following Examples.

EXAMPLES

I Production and Properties of the Graft Copolymers

1. Starting Components

| | |
|---|---|
| LIPOXOL 4000 | Polyethylene glycol 4000 from Hüls |
| TBPB | t-Butyl peroxybenzoate from Peroxid-Chemie |
| LUCIDOL CH 50X | Dibenzoyl peroxide from Akzo |
| IRGANOX 1010 | Phenolic antioxidant from Ciba Spezialitätenchemie |
| BREOX 75W 18000 | Statistical ethylene oxide/propylene oxide copolymer from International Speciality Chemicals |
| Vac | Vinyl acetate |
| VEOVA 10 | Vinyl versatate from Shell |
| VL | Vinyl laurate |
| LA | Lauryl acrylate |
| DBM | Dibutyl maleate |

2. Examples

Example 1

100 g LIPOXOL 4000 were introduced into a 1-liter four-necked flask equipped with a stirrer, thermometer, nitrogen inlet, dropping funnel, reflux condenser and heating bath and were melted at a bath temperature of 90° C. 15 g vinyl acetate, 0.7 g TBPB and 0.3 g LUCIDOL CH 50× dissolved in 3.4 g ethyl acetate were then added. 385 g vinyl acetate were then added dropwise over a period of 5 hours at that temperature. After the dropwise addition, the mixture was stirred for 1 hour at a bath temperature of 90° C. The reflux condenser was then replaced by a descending condenser, the reaction mixture was heated to 160° C. and volatile constituents were distilled off over a period of 45 minutes. 2 g IRGANOX 1010 were then added and the whole was degassed for another 20 minutes at 160° C. in a vacuum of 15 mbar. A light yellow reaction product with a melt viscosity of 12,000 mPa·s at 150° C. was obtained.

Example 2

The procedure was as in Example 1, except that polyethylene glycol 4000 was replaced by polyethylene glycol 1500. A light yellow reaction product with a melt viscosity of 4,200 mPa·s at 150° C. was obtained.

Examples 3 to 8 (see Table 1)

The batch size of the following Examples was 500 g.

The polyalkylene oxide was introduced into the apparatus described in Example 1 and was melted at a bath temperature of 90° C. 15 g vinyl acetate and the initiator were then added. The remaining quantity of monomer was then added dropwise over the periods shown in the Table. After the addition, the mixture was left to react for the periods indicated at a bath temperature of 90° C. The reflux condenser was then replaced by a descending condenser, the reaction mixture was heated to 160° C. and volatile constituents were distilled off over a period of 45 minutes. 2.5 g IRGANOX 1010 were then added and the mixture was degassed for another 20 minutes at 160° C. in a vacuum of 15 mbar.

Examples 9 to 11 (Table 2)

The batch size of the following Examples was 500 g.

The polyalkylene oxide was introduced into the apparatus described in Example 1 and was melted at a bath temperature of 90° C. 15 g of the monomer mixture shown in Table 2 and the initiator were then added. The remaining quantity of monomer was then added dropwise over the periods shown in Table 2. After the addition, the mixture was left to react for the periods indicated at a bath temperature of 90° C. The reflux condenser was then replaced by a descending condenser, the reaction mixture was heated to 160° C. and volatile constituents were distilled off over a period of 45 minutes. 2.5 g IRGANOX 1010 were then added and the mixture was degassed for another 20 minutes at 160° C. in a vacuum of 15 mbar.

TABLE 2

| | Example | | |
|---|---|---|---|
| | 9 | 10 | 11 |
| Polyalkylene oxide [ratio by weight] | PEG 4000 | PEG 4000 | PEG 4000 |
| Monomer [ratio by weight] | Vac + VEOVA 10 [5:2] | VAc + BuA [5:2] | Vac + DBM [5:2] |
| Ratio by weight of polyalkylene oxide to monomer | 30:70 | 30:70 | 30:70 |
| Quantity of monomer [g] | 350 | 350 | 350 |
| Monomer addition time [hours:mins.] | 3:30 | 6:30 | 6:15 |
| After-reaction [hours:mins.] | 01:30 | 03:00 | 06:00 |
| Initiator [% by weight based on monomer] | 0.113 DBP*) + 0.175 t-BPB | 0.075 DBP*) + 0.175 t-BPB | 0.075 DBP*) + 0.175 t-BPB |
| Viscosity [mPa · s] | 15,100 at 100° C. | 13,700 at 100° C. | 11,200 at 100° C. |

*)LUCIDOL CH 50X

TABLE 1

| Example | 3 | 4 | 5 | 6 | 7 | 8 |
|---|---|---|---|---|---|---|
| Polyalkylene oxide [ratio by weight] | PEG 4000 | PEG 4000 | PEG 6000 | PEG 12000 | PEG 20000 | PEG 20000 |
| Monomer [ratio by weight] | Vac | Vac | Vac | VAc | VAc | VAc |
| Ratio by weight of polyalkylene oxide to monomer | 50:50 | 30:70 | 40:60 | 30:70 | 50:50 | 70:30 |
| Quantity of monomer [g] | 250 | 350 | 300 | 350 | 250 | 150 |
| Monomer addition time [hours:mins.] | 02:40 | 03:42 | 01:40 | 05:20 | 03:23 | 02:14 |
| After-reaction [hours:mins.] | 01:15 | 02:55 | 01:30 | 03:10 | 02:30 | 01:25 |
| Initiator [% by weight based on monomer] | 0.075 DBP*) + 0.175 TBPB | 0.075 DBP*) + 0.175 TBPB | 0.075 DBP*) + 0.175 TBPB | 0.075 DBP*) + 0.175 TBPB | 0.075 DBP*) + 0.175 TBPB | 0.075 DBP*) + 0.175 TBPB |
| Viscosity [mPa · s] | 1,280 at 100° C. | 14,400 at 100° C. | 15,360 at 100° C. | 20,640 at 150° C. | 18,560 at 150° C. | 9,600 at 150° C. |

*)LUCIDOL CH 50X

Example 12

80 g LIPOXOL 4000 were introduced into a 1-liter four-necked flask equipped with a stirrer, thermometer, nitrogen inlet, dropping funnel, reflux condenser and heating bath and were melted at a bath temperature of 90° C. 5 g vinyl acetate, 0.49 g TBPB and 0.21 g LUCIDOL CH 50× dissolved in 2.59 g ethyl acetate were then added. 275 g vinyl acetate were then added dropwise over a period of 5 hours at 95° C. After the dropwise addition, the mixture was stirred for 1 hour at an internal temperature of 100° C. 40 g crotonic acid, 0.1 g TBPB and 0.03 g LUCIDOL dissolved in 0.37 g ethyl acetate were then added and the whole was stirred for 1 hour at 100° C. The reflux condenser was then replaced by a descending condenser, the reaction mixture was heated to 160° C. and volatile constituents were distilled off over a period of 45 minutes. 1 g BHT was then added and the whole was degassed for another 20 minutes at 160° C. in a vacuum of 15 mbar. A light yellow reaction product with a melt viscosity of 3,400 mPa·s at 150° C. was obtained.

Example 13

A mixture of 125 g polyethylene glycol 12000 and 75 g BREOX 75W 18000 was introduced into a 1-liter four-necked flask equipped with a stirrer, thermometer, nitrogen inlet, dropping funnel, reflux condenser and heating bath and was melted at a bath temperature of 90° C. 15 g vinyl acetate, 0.53 g TBPB and 0.45 g LUCIDOL CH 50×

Example 14

120 g polyethylene glycol 12000 were introduced into a 1-liter four-necked flask equipped with a stirrer, thermometer, nitrogen inlet, dropping funnel, reflux condenser and heating bath and were melted at a bath temperature of 90° C. A mixture of 260 g vinyl acetate, 20 g vinyl laurate and 14 g of a 5.85% by weight solution of LUCIDOL CH 50× in ethyl acetate was then added dropwise over a period of 5 hours. After the dropwise addition, the mixture was left to react for 30 mins. at a bath temperature of 90° C. 0.49 g tert-butyl peroxybenzoate was then added and the mixture was stirred for 1 hour at 125° C. The reflux condenser was then replaced by a descending condenser, the reaction mixture was heated to 160° C. and volatile constituents were distilled off over a period of 40 minutes. 2 g IRGANOX 1010 were then added and the whole was degassed for another 20 minutes at 160° C. in a vacuum of 15 mbar. A light yellow reaction product with a melt viscosity of 7,000 mPa·s at 150° C. was obtained.

Examples 15 to 20 (Table 3)

The batch size of the following Examples was 500 g.

The polyalkylene oxides mentioned below were reacted with the monomers as in Example 14. The results are set out in Table 3.

TABLE 3

| Example | 15 | 16 | 17 | 18 | 19 | 20 |
|---|---|---|---|---|---|---|
| Polyalkylene oxide [ratio by weight] | PEG 600 | PEG 12000 | PEG 12000 | PEG 6000 + BREOX 75W 18000 [2.5:1.5] | PEG 12000 + BREOX 75W 18000 [2.5:1.5] | PEG 12000 + PEG 600 [10:10] |
| Monomer [ratio by weight] | Vac | Vac + VL [5:2] | Vac + LA [5:1] | VAc + VL [5:1] | VAc + VL [5:1] | VAc |
| Ratio by weight of polyalkylene oxide to monomer | 20:80 | 30:70 | 30:70 | 40:60 | 40:60 | 20:80 |
| Quantity of monomer [g] | 400 | 350 | 350 | 300.00 | 300.00 | 350.00 |
| Monomer addition time [hours:mins.] | 5:00 | 3:30 | 3:40 | 2:45 | 2:40 | 4:15 |
| After-reaction [hours:mins.] | 1:30 | 1:30 | 1:30 | 1:30 | 1:30 | 1:30 |
| Initiator [% by weight based on monomer] | 0.293 DBP*) + 0.175 TBPB | 0.293 DBP*) + 0.175 TBPB | 0.293 DBP*) + 0.175 TBPB | 0.293 DBP*) + 0.175 TBPB | 0.293 DBP*) + 0.175 TBPB | 0.293 DBP*) + 0.175 TBPB |
| Viscosity [mPa · s] | 8,300 at 100° C. | 3,500 at 100° C. | 7,400 at 100° C. | 1,300 at 150° C. | 4,300 at 150° C. | 5,400 at 150° C. |

*)LUCIDOL CH 50X dissolved in 3.55 g ethyl acetate were then added. 285 g vinyl acetate were then added dropwise over a period of 5 hours at an internal temperature of 85° C. After the dropwise addition, the mixture was stirred for 1.5 hours at a bath temperature of 90° C. The reflux condenser was then replaced by a descending condenser, the reaction mixture was heated to 160° C. and volatile constituents were distilled off over a period of 45 minutes. 2 g IRGANOX 1010 were then added and the whole was degassed for another 20 minutes at 160° C. in a vacuum of 15 mbar. A light yellow reaction product with a melt viscosity of 7,000 mPa·s at 150° C. was obtained.

II. Production and Properties of the Hotmelt Adhesives

1. Starting Components a) EASTMAN AQ 1045, a polyester from Eastman Chemical
b) Polyethylene glycol PEG 400 and PEG 600 from Clariant
c) JONCRYL 682, acrylic acid copolymer from S.C. Johnson Polymer
d) G-Cryl 5005, acrylic resin from Cognis Corporation
e) PEARLBOND 501, a polyurethane from Merquinsa
f) ELVACITE 2978, a polyacrylate from Ineos Acrylics g) ELVACITE 4026, a UV-reactive polyacrylate from Ineos Acrylics
h) K 4100, a polyacrylate from Belland 2. Production of the Hotmelt Adhesives by Mixing The formulations of the Examples (Table 4) were prepared by the generally known method. To this end, the polyethylene glycol, the resin and the polyester, the polyurethane or the polyacrylate were mixed at 140° C. in a laboratory stirrer until they appeared visually homogeneous. The graft copolymer was then added and also completely homogenized. This generally takes a total of ca. 60 to 120 mins. Depending on its composition, the melt is transparent, opaque or hazy (the same also applies to the melt cooled to room temperature). The melt mixture was packed in containers and then cooled, solidifying in the process. After cooling, it was used for various purposes according to its composition.

EXAMPLES

TABLE 4

(composition in % by weight)

| Components | Example | | | | | | | | |
|---|---|---|---|---|---|---|---|---|---|
| | 1 | 2 | 3 | 4 | 5 | 6 | 7 | 8 | 9 |
| Graft copolymer of Example 16 | 25 | — | — | 41 | 62 | — | — | — | — |
| Graft copolymer of Example 18 | — | 30 | 35 | — | — | — | — | — | — |
| Graft copolymer of Example 20 | — | — | — | — | — | 41 | 41 | 41 | 41 |
| PEG 400 | 15 | 5 | 20 | 12 | — | 12 | 12 | 12 | 12 |
| PEG 600 | — | — | — | — | 8 | — | — | — | — |
| JONCRYL 682 | 20 | — | — | 35 | 20 | 35 | 35 | 35 | 35 |
| G-Cryl 5005 | 30 | 65 | 25 | — | — | — | — | — | — |
| EASTMAN AQ 1045 | 10 | — | 20 | 12 | 10 | — | — | — | — |
| PEARLBOND 501 | — | — | — | — | — | 12 | — | — | — |
| ELVACITE 2978 | — | — | — | — | — | — | 12 | — | — |
| ELVACITE 4026 | — | — | — | — | — | — | — | 12 | — |
| K4100 | — | — | — | — | — | — | — | — | 12 |
| Total | 100 | 100 | 100 | 100 | 100 | 100 | 100 | 100 | 100 |

Example 22 of US patent application U.S. Pat. No. 3,891,584 was copied for comparison. This Example contains a mixture of 75% of a copolymer of PEG 4000 and vinyl acetate in a ratio of 35:65 and 25% Nevillac soft.

4. Description of the Hotmelt Adhesives

Example 1

Pressure-sensitive low-viscosity hotmelt adhesive with a heat resistance of ca. 80° C. and a processing temperature of ca. 120° C. The hotmelt adhesive may be used for labeling aerosol cans, shaped bottles and beverage cans with subsequent shrinkage of the labels, preferably based on OPP.

Example 2

Non-pressure-sensitive, granulatable hotmelt adhesive which is particularly suitable for bonding highly lacquered paperboards and papers and for the labeling of goods intended for prolonged storage at ca. 60° C.

Example 3

Hotmelt adhesive for labeling and coating films. Heat resistance ca. 80° C.

Example 4

Pressure-sensitive low-viscosity hotmelt adhesive for labeling plastic bottles.

Example 5

Pressure-sensitive hotmelt adhesive for labeling goods using commercially available nozzle systems (for example from Nordson).

TABLE 5

| | | Epprecht viscosity (cone D) | |
|---|---|---|---|
| Example | Appearance of melt | 125° C. | 150° C. |
| 6 | Dark brown; clear | 2.64 Pa · s | 0.92 Pa · s |
| 7 | Light yellow; clear | 7.04 Pa · s | 2.24 Pa · s |
| 8 | Light yellow; clear | 6.72 Pa · s | 2.00 Pa · s |
| 9 | Light yellow | 7.04 Pa · s | 2.27 Pa · s |

III Testing of the Hotmelt Adhesives

1. Labeling

In a Krones "Conti Roll" test labelling unit, the hotmelt adhesive of Examples 1 to 9 was applied in strips to the beginning and end of OPP labels in a quantity of 1.1 g/m$^2$ (corresponding to a quantity of 0.05 g/label) at a temperature of 140° C. PET bottles were labeled in this way.

IV Results

Solubility in Cold and Warm Water

The formulations of Examples 1 to 9 show good and rapid removal of the adhesive from plastic surfaces, for example, plastic surfaces of polyethylene terephthalate (PET). The adhesive removed is present in the form of a fine-particle dispersion in water. By comparison, the formulation from U.S. Pat. No. 3,891,584 (Example 22) is very coarsely dispersed in water.

Alkali Solubility:

The formulations of Examples 1 to 9 show very good alkali solubility. The comparison formulation of Example 22 of U.S. Pat. No. 3,891,584 forms a coarse dispersion with even residues of the adhesive remaining on the test specimen.

Polyrecycling Method:

The hotmelt adhesives of Examples 1 to 8 show a removal of more than 98% in the Polyrecycling method and may therefore be classified as good. The comparison from U.S. Pat. No. 3,891,584 (Example 22) shows a removal of ca. 45% which would have to be classified as unacceptable.

Containers Containing Carbon Dioxide:

All the hotmelt adhesives of Examples 1 to 9 show good adhesion of plastic labels to plastic surfaces and have the required flexibility when it comes to filling with liquids containing carbon dioxide and storage.

V Description of the Test Methods

Melt viscosity: Brookfield Model PVT DV II, 150° C., spindle 27; by ASTM D 3236-88

Epprecht viscosity, Cone D, ICI viscosimeter, by DIN 53229

Softening point by DIN 52011 (ring/ball method)

Stringing: a glass rod is introduced into the hotmelt adhesive melted at ca. 160° C. and slowly withdrawn and the Theological behavior of the hotmelt adhesive is visually evaluated. Evaluation includes the manner in which the molten adhesive drips off the glass rod and the formation of adhesive threads during withdrawal of the glass rod from the adhesive melt.

Heat resistance: the labeled containers are stored in a drying cabinet for 14 days at increasing temperatures. The adhesion quality of the overlap and pickup bonds is then evaluated. The heat resistance value is the maximum temperature at which storage is still possible without any loss of bond quality.

Polyrecycling: method of Polyrecycling AG (CH-8570 Weinfelsen).

Determination of solubility in cold water and warm water: Solubility in cold water is determined at 25° C.; solubility in warm water at 60° C. This method is used for laminates containing up to 3% adhesive. The test specimens are prepared to the specification of Polyrecycling AG (Polyrecycling method, see above).

Alkali solubility: Alkali solubility is tested at 60° C. in 1.5% caustic soda. This method is used for laminates containing up to 3% adhesive. The test specimens are prepared to the specification of Polyrecycling AG (Polyrecycling method, see above).

What is claimed is:

1. A water-soluble or water-dispersible hotmelt adhesive comprising:
   A) 20 to 80% by weight of at least one component (A),
   B) 1 to 70% by weight of at least one polymer selected from the group consisting of polyesters, polyurethanes, alkyl poly(meth)acrylates, acrylic acid homopolymers, acrylic acid copolymers and vinyl polymers as component (B),
   C) 10 to 70% by weight of at least one resin as component (C) that is different from said at least one polymer of component (B), said resin comprising styrene/acrylic acid copolymer,
   D) 0 to 30% by weight of at least one plasticizer as component (D),
   E) 0 to 3% by weight of at least one additive as component (E),
   the sum total of components (A) to (E) being 100% by weight and component (A) being a graft copolymer containing:
   i) 30 to 90% by weight olefinically unsaturated monomer, wherein said olefinically unsaturated monomer corresponds to one or more monomers selected from
      (i-a) at least one olefinically unsaturated monomer selected from the group consisting of
         a) mono- and di-esters of crotonic acid, cinnamic acid, fumaric acid, maleic acid, citraconic acid, and itaconic acid;
         b) carboxyfunctional monomers;
         c) N-vinyl caprolactam, vinyl phosphonates, N-vinyl formamides, N-vinyl acetamides, hydroxypropyl acrylates and methacrylates, monoacrylates and monomethacrylates of polyalkylene glycols, acrylates, methacrylates, acrylic acid and methacrylic acid amides containing amine groups;
         d) vinyl esters corresponding to general formula (I)
            $CH_2=CH-O-C(O)-R_1$, with $R_1=C_{11-21}$, (I)
         the at least one olefinically unsaturated monomer of group (a), (b), (c) or (d) being present in the graft copolymer in a quantity of up to 50% by weight; or
      (i-b) a mixture of olefinically unsaturated monomers of vinyl acetate and, based on the graft copolymer, up to 50% by weight of at least one olefinically unsaturated monomer selected from the group consisting of stearyl acrylate, vinyl laurate, vinyl versatate, lauryl acrylate, lauryl methacrylate, dibutyl maleate, dibutyl itaconate, dibutyl fumarate and acrylates and methacrylates corresponding to general formula (II):
            $CH_2=CR_2-C(O)-O-R_3$ with $R_2=H$ or $CH_3$ and $R_3=C_{12-22}$; (II) or
      (i-c) at least one monomer selected from the group consisting of vinyl acetate and vinyl propionate; and
   ii) 10 to 70% by weight of polyalkylene oxide where the ethylene oxide content of the polyalkylene oxide is at least 50% by weight.

2. A hotmelt adhesive as claimed in claim 1, wherein the olefinically unsaturated monomer corresponds to group (i-a) and contains at least one olefinically unsaturated monomer selected from the group consisting of acrylates and methacrylates corresponding to general formula (II):

$CH_2=CR_2-C(O)-O-R_3$ with $R_2=H$ or $CH_3$ and $R_3=C_{12-22}$ (II).

3. A hotmelt adhesive as claimed in claim 1, wherein the ethylene oxide content of the graft copolymer is at least 75% by weight.

4. A hotmelt adhesive as claimed in claim 1 having a Brookfield viscosity at 150° C. of 200 mPa·s to 2,500 mPa·s, as measured by ASTM D 3236-88.

5. A hotmelt adhesive as claimed in claim 1, wherein the polyalkylene oxides are selected from the group consisting of homopolymers of ethylene oxide, block copolymers of ethylene oxide and propylene oxide, statistical copolymers of ethylene oxide and propylene oxide, ether-terminated homopolymers of ethylene oxide, ester-terminated homopolymers of ethylene oxide, ether-terminated block copolymers of ethylene oxide and propylene oxide, ester-terminated block copolymers of ethylene oxide and propylene oxide, ether-terminated statistical copolymers of ethylene oxide and propylene oxide, and ester-terminated statistical copolymers of ethylene oxide and propylene oxide.

6. A hotmelt adhesive as claimed in claim 1, wherein the polyalkylene oxide is a mixture of at least one high molecular weight polyalkylene oxide and at least one low molecular weight polyalkylene oxide, said mixture having a Brookfield melt viscosity of 100 mPa·s to 80,000 mPa·s at 100° C., as measured by ASTM D 3236-88.

7. A hotmelt adhesive as claimed in claim 1 wherein the graft copolymer is comprised of 60 to 80% by weight olefinically unsaturated monomer.

8. A hot melt adhesive as claimed in claim 1, wherein component (B) is comprised of at least one of:
- B1) 10 to 50% by weight, based on the weight of the hotmelt adhesive, of at least one (meth)acrylic acid polymer;
- B2) 5 to 30% by weight, based on the weight of the hotmelt adhesive, of at least one polyester;
- B3) at least one alkyl poly(meth)acrylate, the alkyl group having a chain length of 1 to 18 carbon atoms;
- B4) at least one polyvinyl alcohol;
- B5) at least one polyvinyl alkylether containing 1 to 14 carbon atoms in the alkyl group; or
- B6) 5 to 30% by weight of at least one polyurethane.

9. A hotmelt adhesive as claimed in claim 1, wherein component (B) comprises a polyester based on aromatic dicarboxylic acids containing sulfo groups.

10. A hotmelt adhesive as claimed in claim 1, wherein component (C) additionally comprises at least one resin selected from the group consisting of a) hydroabietyl alcohol and esters thereof; b) natural resins and modified natural resins; c) copolymers of styrene and maleic anhydride; d) acrylic acid copolymers other than styrene/acrylic acid copolymers; e) resins based on functional hydrocarbon resins; and (f) alkyl esters of partly hydrogenated rosins.

11. A hotmelt adhesive as claimed in claim 1, comprising:
- A) 20 to 80% by weight of component (A);
- B) 5 to 20% by weight of at least one polyester as component (B2);
- C) 10 to 70% by weight of at least one styrene/acrylic acid copolymer as component (C);
- D) 5 to 25% by weight of at least one plasticizer based on polyalkylene glycol with a molecular weight of 200 to 6,000 g/mol as component (D);

the sum total of the components being 100% by weight.

12. An article of manufacture comprising a hotmelt adhesive as claimed in claim 1 and a substrate.

13. An article of manufacture as claimed in claim 12, wherein said article of manufacture is selected from the group consisting of hollow containers, books, boxes, and sanitary articles.

14. An article of manufacture as claimed in claim 12, wherein said substrate is comprised of plastic.

15. An article of manufacture as claimed in claim 12, comprising said hotmelt adhesive, a hollow container, and a label wherein said label is bonded to said hollow container using said hotmelt adhesive.

* * * * *